United States Patent
Buse et al.

(10) Patent No.: US 8,490,944 B2
(45) Date of Patent: Jul. 23, 2013

(54) ELECTROMAGNETIC VALVE HAVING AN ADJUSTABLE MAGNETIC FLUX

(75) Inventors: Werner Buse, Kaarst (DE); Alvito Fernandes, Leverkusen (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 13/382,293

(22) PCT Filed: May 19, 2010

(86) PCT No.: PCT/EP2010/056890
§ 371 (c)(1),
(2), (4) Date: Jan. 5, 2012

(87) PCT Pub. No.: WO2011/003661
PCT Pub. Date: Jan. 13, 2011

(65) Prior Publication Data
US 2012/0097876 A1    Apr. 26, 2012

(30) Foreign Application Priority Data
Jul. 8, 2009    (DE) .......................... 10 2009 032 367

(51) Int. Cl.
*F16K 31/02*    (2006.01)
(52) U.S. Cl.
USPC ..................................... 251/129.17; 335/237
(58) Field of Classification Search
USPC ........ 251/129.15, 129.17, 336–337; 335/237, 335/298
See application file for complete search history.

(56) References Cited

U.S. PATENT DOCUMENTS

| 2,442,016 A | * | 5/1948 | Poole ............................ 335/237 |
| 4,463,332 A | | 7/1984 | Everett |
| 4,468,643 A | * | 8/1984 | Barger .......................... 335/298 |
| 4,610,428 A | * | 9/1986 | Fox ................................ 335/237 |
| 4,932,439 A | * | 6/1990 | McAuliffe, Jr. .......... 251/129.18 |
| 4,954,799 A | | 9/1990 | Kumar |
| 5,110,087 A | | 5/1992 | Studtmann et al. |
| 5,758,626 A | | 6/1998 | Maley |
| 5,853,028 A | * | 12/1998 | Ness et al. .................... 335/237 |
| 5,890,662 A | * | 4/1999 | Dykstra ........................ 335/237 |

(Continued)

FOREIGN PATENT DOCUMENTS

| DE | 40 23 826 A1 | 1/1992 |
| DE | 41 10 003 C1 | 7/1992 |

(Continued)

OTHER PUBLICATIONS

English Translation of DE4110003, Jul. 1992.*

*Primary Examiner* — John Bastianelli
(74) *Attorney, Agent, or Firm* — Norman B. Thot

(57) ABSTRACT

An electromagnetic drive for a valve includes a housing and at least one electromagnetic circuit comprising a coil wound onto a coil carrier, a valve closing member, an armature movably supported between a first and a second end position which acts on the valve closing member. A device fixes the armature in a currentless state. A core is disposed at an end of the electromagnetic drive directed toward the valve closing member. A magnetizable reflux device has an adjusting bore and a circumferential recess in an area of the adjusting bore on a side facing the coil. An adjustment device has an adjusting screw and adjusts a magnetic force. The adjusting screw influences a course of magnetic field lines and is insertable into the adjusting bore in a direction of the armature. Supplying the coil with a current moves the armature into the first or the second end position.

8 Claims, 2 Drawing Sheets

U.S. PATENT DOCUMENTS

| | | |
|---|---|---|
| 6,631,633 B1 | 10/2003 | Garg et al. |
| 6,659,424 B2 * | 12/2003 | Buse et al. ............... 251/129.15 |
| 7,350,763 B2 * | 4/2008 | Hofling .................... 251/129.15 |
| 2006/0145545 A1 | 7/2006 | Reichert et al. |
| 2009/0189105 A1 * | 7/2009 | Dayton ................... 251/129.15 |
| 2010/0155638 A1 | 6/2010 | Zurke |

FOREIGN PATENT DOCUMENTS

| | | |
|---|---|---|
| DE | 10 2007 002 153 B3 | 12/2007 |
| DE | 10 2007 028910 B3 | 5/2008 |
| DE | 10 2007 002465 A1 | 7/2008 |
| WO | WO 2004/044932 A1 | 5/2004 |

* cited by examiner

ELECTROMAGNETIC VALVE HAVING AN ADJUSTABLE MAGNETIC FLUX

CROSS REFERENCE TO PRIOR APPLICATIONS

This application is a U.S. National Phase application under 35 U.S.C. §371 of International Application No. PCT/EP2010/056890, filed on May 19, 2010 and which claims benefit to German Patent Application No. 10 2009 032 367.8, filed on Jul. 8, 2009. The International Application was published in German on Jan. 13, 2011 as WO 2011/003661 A1 under PCT Article 21(2).

FIELD

The present invention provides an electromagnetic drive for a valve, comprising a housing having at least one electromagnetic circuit which is composed of a coil wound onto a coil carrier, an armature, at least one core and at least one magnetizable reflux device, wherein the armature is movably supported between two end positions and acts, at least indirectly, on a valve closing member, wherein means/device are provided to fix the armature in the currentless state, wherein supplying the coil with a current causes a movement of the armature in the first or the second end position, means/device being provided for adjusting the magnetic force and the core being provided at the end of the electromagnetic drive which is directed toward the valve closing member.

BACKGROUND

DE 10 2007 002 153 B3 describes an electromagnetic drive for a pressure control valve. Due to tolerances of component parts or a specific selection of materials, a dispersion of the magnetic force is inevitably caused which makes it necessary to adjust the magnetic force after assembly of the electromagnetic drive. DE 10 2007 002 153 B3 describes a mechanical adjustment wherein, with the aid of a setting screw, the bias force of a spring is set so that a specific additional magnetic force must be applied to move the armature from a first end position into a second end position. A disadvantage of said adjustment is that there is once set a constant biasing force which then will be effective in each operational state of the electromagnetic drive, irrespective of the amount of the respective magnetic force. The solution described in DE 10 2007 002 153 B3 also requires an additional component part, such as a spring.

SUMMARY

An aspect of the present invention is to provide an electromagnetic drive which avoids the above described disadvantages and which can be produced in an advantageous manner with a minimum number of component parts.

In an embodiment, the present invention provides an electromagnetic drive for a valve which includes a housing and at least one electromagnetic circuit comprising a coil wound onto a coil carrier, a valve closing member, an armature movably supported between a first end position and a second end position. The armature is configured so as to act at least indirectly on the valve closing member. A device is configured to fix the armature in a currentless state. At least one core is disposed at an end of the electromagnetic drive directed toward the valve closing member. At least one magnetizable reflux device has an adjusting bore and a circumferential recess in an area of the adjusting bore on a side facing the coil. At least one adjustment device has an adjusting screw. The at least one adjustment device is configured to adjust a magnetic force. The adjusting screw is configured to influence a course of magnetic field lines and to be insertable into the adjusting bore in a direction of the armature. Supplying the coil with a current causes the armature to move into the first end position or into the second end position. The number of magnetic field lines in the region of the transition to the armature can thus be increased, and the magnetic force can thereby be directly influenced, said recess preventing a dispersion of the magnetic field lines and thus preventing a weakening of the magnetic force.

BRIEF DESCRIPTION OF THE DRAWINGS

The present invention is described in greater detail below on the basis of embodiments and of the drawings in which.

DETAILED DESCRIPTION

For performing the adjustment with maximum precision, the recess can be a groove whose penetration depth increases in a substantially linear manner at least on the side facing toward the armature.

For support of the armature, the reflux device can comprise a slide bearing bushing. In an embodiment of the present invention, the adjustment screw can, for example, be arranged in the reflux device via a thread or a knurl.

In the case of a fast movement of the armature, the reflux device and/or the adjustment screw can, for example, comprise a respective pressure compensation bore.

A membrane can also be provided which, by a radially outward face, can be arranged in the housing and, by a radially inward face, can be arranged on the valve closing member so that the electromagnetic drive is sealed against the valve. In this manner, depending on the medium which is used in the to-be-controlled valve, a contamination of the electromagnetic drive can be effectively prevented. In an embodiment of the present invention, the membrane can, for example, have a resilient force fixing the armature in an end position. The reflux device can, for example, comprise an adjustment bore extending to the first end position, said adjustment bore being adapted for insertion thereinto of a headless screw as an adjustment screw.

Figure 1:
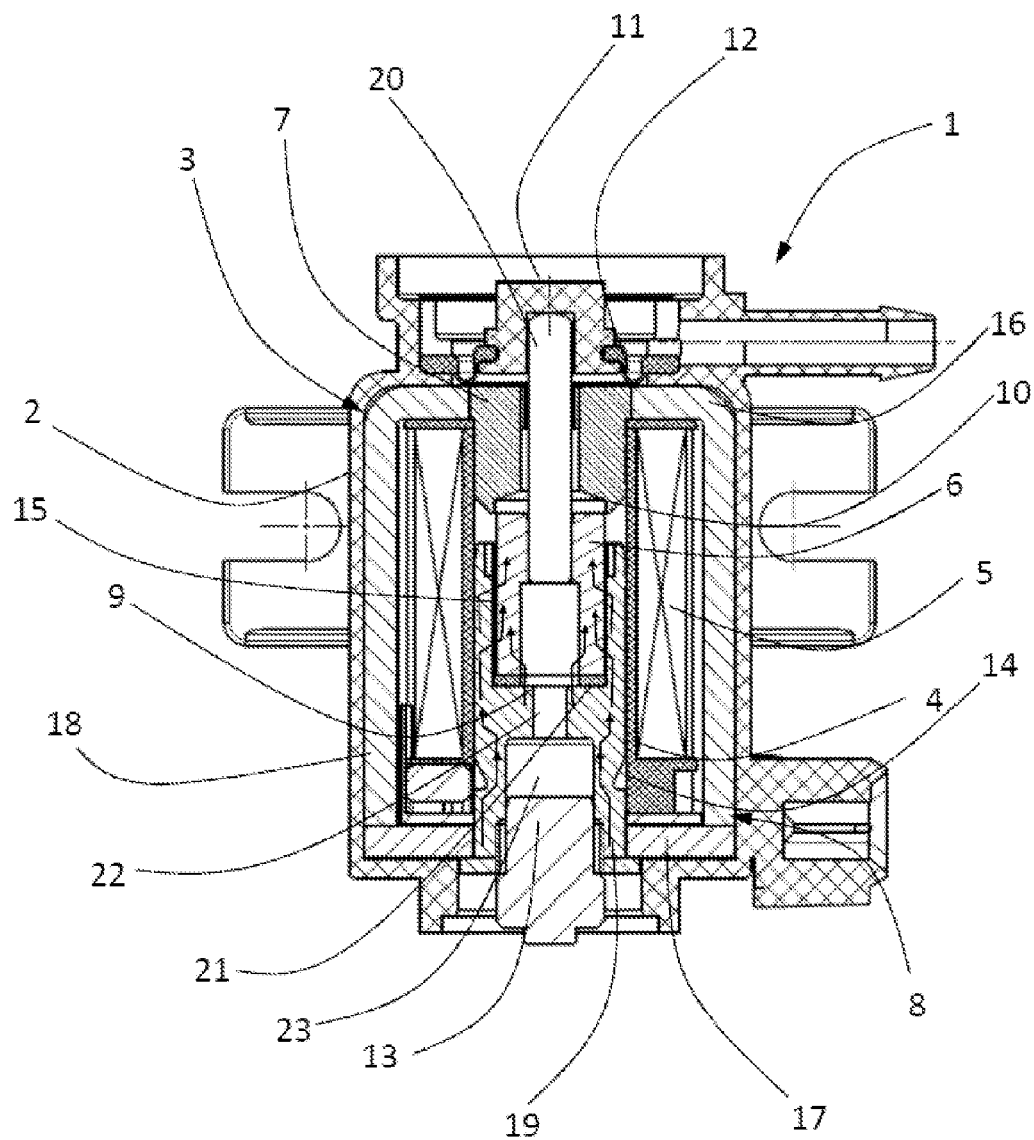
FIG. 1 shows a schematic sectional view of an electromagnetic drive according to the present invention with the adjustment screw in a first position.

FIG. 1 shows an electromagnetic drive 1 according to the present invention which in the present case is operative to act on a valve closing member 11. In the present case, the appertaining valve is not shown in greater detail. It should be noted, however, that the illustrated embodiment of the electromagnetic drive 1 is suited for a pressure control valve.

In the shown embodiment, the electromagnetic drive 1 comprises a housing 2 with an electromagnetic circuit 3, wherein a coil 5 is wound on a coil carrier 4. Further provided is a core 7 at the end of the electromagnetic drive 1 facing toward the valve closing member 11, said core being fastened to a reflux device 8.

In the shown embodiment, reflux device 8 substantially comprises three reflux metal sheets 16, 17, 18 and a reflux member 19. The reflux member 19 is arranged in the coil carrier 4 via locking hooks (not illustrated). The armature 6 has an annular shape at least on the side facing away from the valve closing member 11, and is connected on the opposite side to the valve closing member 11 via a valve stem 20.

In the shown embodiment, the armature 6 is fixed in a first, end position 9. In the present case, this fixation is achieved by the spring force of a membrane 12, wherein said membrane 12 is arranged in the housing 2 by a radially outward face and is arranged on the valve closing member 11 by a radially inward face. It should be evident, however, that such a fixation can be realized also by means of suitable springs.

Armature 6, which is movable in axial direction, is supported in reflux member 19 via a slide bearing bushing 15 which in the present case is a DU bushing. In the first end position 9, there is further provided a non-magnetizable abutment element 22 for abutment of the armature 6 thereon in the first end position 9.

When electric current is supplied to the electromagnetic drive 1, the magnetic flux lines will take the course represented in FIG. 1 and the armature will be pulled by core 7 into the second end position 10.

Figure 2:
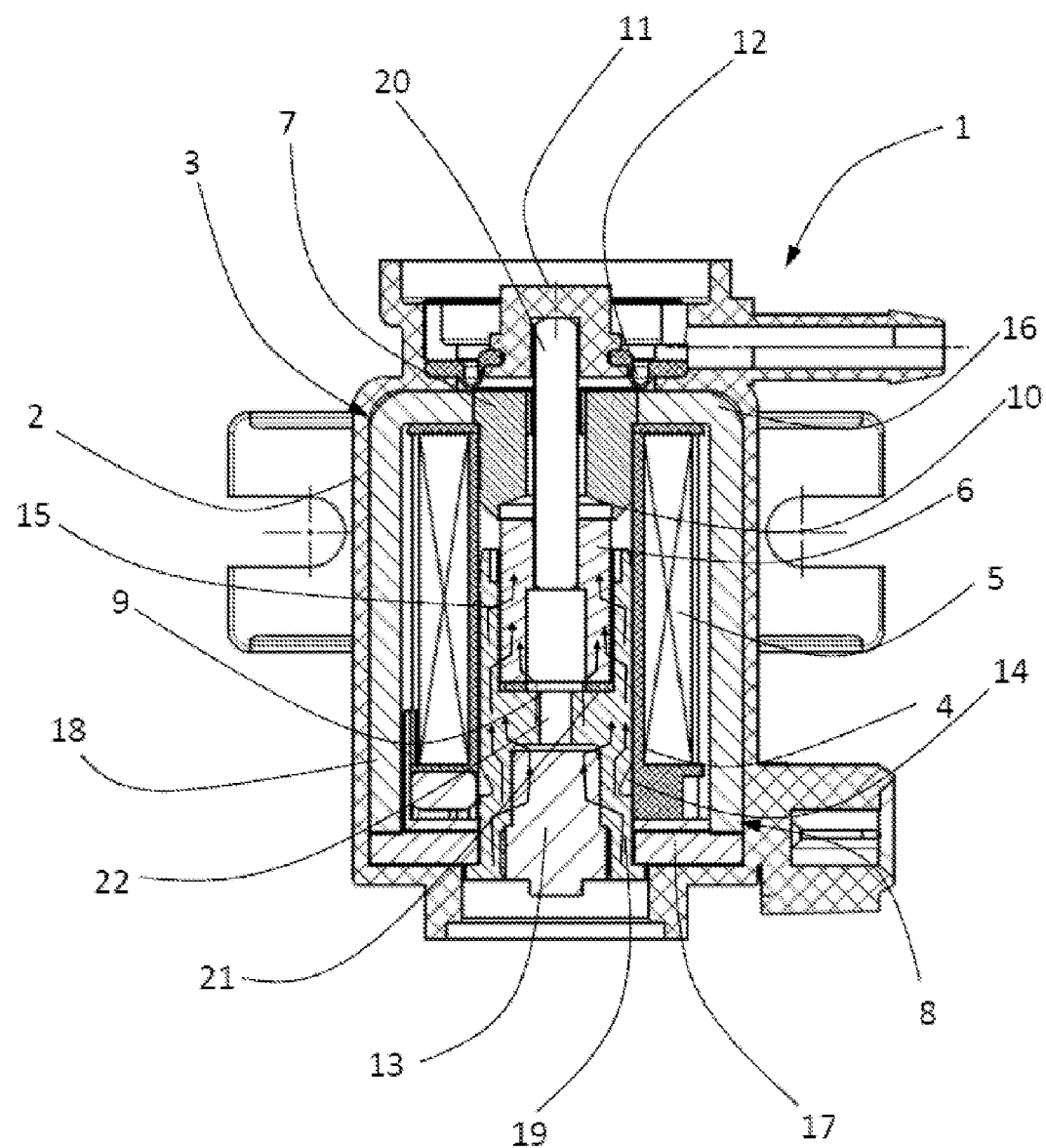
FIG. 2 shows is a schematic sectional view of an electromagnetic drive according to the present invention with the adjustment screw in a second position.

In case it becomes evident after assembly that the magnetic force resulting from a predetermined control current is not in the desired tolerance range, it is possible to perform a fine-adjustment of the electromagnetic drive with the aid of an adjustment screw 13. For this purpose, adjustment screw 13, which via a thread or also a knurl is arranged in the reflux member 19, can be moved in the direction of armature 6. The number of the magnetic field lines in the reflux member 19 as shown in FIG. 2 is considerably enlarged, thereby resulting in an increase of the magnetic force. To prevent dispersion of the magnetic field lines in the region of the transition from the reflux member 19 to the armature 6, a circumferential recess 14 is provided in the region of the adjustment bore 23 on that side of the reflux member 19 which is directed toward the coil 5.

In case of a fast oscillating movement of armature 6, the reflux member can, for example, comprise a pressure compensation bore 21 as in the present example. The adjustment screw 13 can also comprise a corresponding bore.

After adjustment with the aid of adjustment screw 13, the electromagnetic drive 1 can be closed in the region of reflux member 19 by use of a lid, which is not shown in greater detail.

For preventing a deviation from the thus set position of the adjustment screw 13 in the reflux member, it is possible, for example, to apply welding spots in the region of the transition between the adjustment screw and the reflux member. Fixation by use of pins is also possible.

It should be evident that the adjustment screw 13 does not necessarily have to be provided with a thread or knurl. It can also be provided as a headless screw which can, for example, be insertable into a continuous bore of reflux device 8.

The present invention is not limited to embodiments described herein; reference should be had to the appended claims.

What is claimed is:

1. An electromagnetic drive for a valve, the electromagnetic drive comprising:
    a housing; and
    at least one electromagnetic circuit comprising:
        a coil wound onto a coil carrier,
        a valve closing member,
        an armature movably supported between a first end position and a second end position, the armature being configured so as to act at least indirectly on the valve closing member,
        a device configured to fix the armature in a currentless state,
        at least one core, the at least one core being disposed at an end of the electromagnetic drive directed toward the valve closing member,
        at least one magnetizable reflux device having an adjusting bore and a circumferential recess in an area of the adjusting bore on a side facing the coil, and
        at least one adjustment device having an adjusting screw, the at least one adjustment device being configured to adjust a magnetic force, and the adjusting screw being configured to influence a course of magnetic field lines and to be insertable into the adjusting bore in a direction of the armature,
    wherein supplying the coil with an electric current causes the armature to move into the first end position or into the second end position.

2. The electromagnetic drive as recited in claim 1, wherein the circumferential recess is provided as a groove with a penetration depth which increases in a substantially linear manner at least on a side facing the armature.

3. The electromagnetic drive as recited in claim 1, wherein the at least one magnetizable reflux device comprises a slide bearing bushing configured to support the armature.

4. The electromagnetic drive as recited in claim 1, further comprising a thread or a knurl, wherein the adjusting screw is arranged in the adjusting bore via the thread or the knurl.

5. The electromagnetic drive as recited in claim 1, wherein at least one of the at least one magnetizable reflux device and the adjusting screw comprise a respective pressure compensation bore.

6. The electromagnetic drive as recited in claim 1, further comprising a membrane comprising a radially outward face arranged in the housing and a radially inward face arranged on the valve closing member so as to seal the electromagnetic drive against the valve.

7. The electromagnetic drive as recited in claim 6, wherein the membrane includes a resilient force configured to fix the armature in the first end position.

8. The electromagnetic drive as recited in claim 1, wherein the adjusting bore of the at least one magnetizable reflux device extends to the first end position and is configured so as to receive a headless screw as the adjusting screw.

\* \* \* \* \*